(12) United States Patent
Horikawa et al.

(10) Patent No.: US 8,266,476 B2
(45) Date of Patent: Sep. 11, 2012

(54) MULTIPROCESSOR SYSTEM, ITS CONTROL METHOD, AND INFORMATION RECORDING MEDIUM

(75) Inventors: Tsutomu Horikawa, Kanagawa (JP); Yasukichi Ohkawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 204 days.

(21) Appl. No.: 12/444,747

(22) PCT Filed: Sep. 26, 2007

(86) PCT No.: PCT/JP2007/068651
§ 371 (c)(1),
(2), (4) Date: Jun. 2, 2009

(87) PCT Pub. No.: WO2008/056489
PCT Pub. Date: May 15, 2008

(65) Prior Publication Data
US 2010/0023665 A1    Jan. 28, 2010

(30) Foreign Application Priority Data

Nov. 9, 2006  (JP) ................................. 2006-304555
Nov. 9, 2006  (JP) ................................. 2006-304559

(51) Int. Cl.
*G06F 11/00*    (2006.01)
(52) U.S. Cl. ............................. 714/11; 714/10; 714/13
(58) Field of Classification Search ............... 714/10–13
See application file for complete search history.

(56) References Cited

U.S. PATENT DOCUMENTS

| | | | |
|---|---|---|---|
| 4,891,810 A * | 1/1990 | de Corlieu et al. | ............. 714/11 |
| 5,522,030 A * | 5/1996 | Matsubara | ...................... 714/4.4 |
| 6,928,584 B2 * | 8/2005 | Labana | .......................... 714/13 |
| 7,159,137 B2 * | 1/2007 | Nemawarkar et al. | ........ 713/503 |

FOREIGN PATENT DOCUMENTS

| | | |
|---|---|---|
| JP | 1224861 A | 7/1989 |
| JP | 7152697 A | 6/1995 |

OTHER PUBLICATIONS

International Preliminary Report on Patentability for corresponding patent application PCT/JP2007/068651, May 26, 2009.
International Search Report for corresponding European Application EP07807867 dated Feb. 18, 2010.

(Continued)

*Primary Examiner* — Yolanda L Wilson
(74) *Attorney, Agent, or Firm* — Matthew B. Dernier, Esq.; Gibson & Dernier LLP

(57) ABSTRACT

To provide a multiprocessor system in which data transmission efficiency is unlikely to be affected if a damaged processor should exist among a plurality of processors. The multiprocessor system has a plurality of processing modules, including a predetermined number, being three or more, of processors, and a bus for relaying data transmission among the respective processing modules, and specifies at least one damaged processor; selects as a communication restricted processor subjected to communication restriction at least one of the processors connected to the bus at a position determined according to a position where the damaged processor is connected to the bus; and restricts data transmission by the communication restricted processor via the bus.

17 Claims, 8 Drawing Sheets

OTHER PUBLICATIONS

S. Venugopal, et al., "A Grid Service Broker for Scheduling Distributed Data-Oriented Applications on Global Grids" Technical Reports Grids TR (Feb. 2004).

Kistler M., et al., "Cell Multiprocessor Communication Network: built for speed" IEE micro, IEEE Service Center (May 1, 2006).

Pieter Bellens, et al., "CellSs: a Programming Model for the Cell BE Architecture" Computer Society proceedings of the 2006 ACM/IEEE SC/06 Conference (2006).

International Search Report for corresponding patent application PCT/JP2007/068651, Nov. 13, 2007.

International Search Report for corresponding European Application EP07807867 dated Jun. 21, 2012.

M. Riley, et al., "Testability Features of the First Generation Cell Processor", International Test Conference, IEEE Operations Center pp. 1-9(Nov. 8, 2005).

* cited by examiner

FIG.5

| LOGICAL PROCESSOR NUMBER | SUB-PROCESSOR |
|---|---|
| 0 | SUB-PROCESSOR 14b |
| 1 | SUB-PROCESSOR 14d |
| 2 | SUB-PROCESSOR 14f |
| 3 | SUB-PROCESSOR 14g |
| 4 | SUB-PROCESSOR 14e |
| 5 | SUB-PROCESSOR 14c |

MULTIPROCESSOR SYSTEM, ITS CONTROL METHOD, AND INFORMATION RECORDING MEDIUM

TECHNICAL FIELD

The present invention relates to a multiprocessor system having a plurality of processors for mutual data exchange via a bus, a control method for the system, and an information storage medium.

BACKGROUND ART

There is available a multiprocessor system having a plurality of processors for each carrying out information processing. In this multiprocessor system, a variety of processing modules, such as each processor, a memory module, a GPU (Graphics Processing Unit), and so forth, are mutually connected via a bus, such as a ring bus, for data exchange. The multiprocessor system may comprise a number of processors that is larger than the number of processors necessary in carrying out an application program, in order to cope with a case where any processor is damaged.

DISCLOSURE OF THE INVENTION

Problems to be Solved by the Invention

The above described multiprocessor system can execute an application program even when some of the processors are not usable due to damage. However, when some processor is damaged, due to absence of commitment of the damaged processor to the data exchange with other processing modules, balance of the data transmission amount within the bus due to data exchange among the respective processing modules is changed, which may affect data transmission efficiency among the respective processing modules.

With the processing modules connected via a ring type bus, including some processor that is inoperable due damaged, arbitrary assignment of a process to other processors, excluding the damaged one, results in changing the content of a process to be carried out by the respective processor. This may lead to change in direction and distance of a data transmission path on the ring type bus. As a result, in attempts to carry out the same program, using different but identically structured multiprocessor systems, different program execution environments may result, depending on which processor is damaged, and difference in program processing speed and so forth may also result.

The present invention has been conceived in view of the above, and one of the objects of the present invention is to provide a multiprocessor system, a control method therefor, and an information storage medium, in which data transmission efficiency is less affected by a damaged processor, if any, among a plurality of processors.

Another one object of the present invention to provide a multiprocessor system, a control method therefor, and an information storage medium, in which a program execution environment is unlikely to be changed depending on which processor among a plurality of processors is damaged.

Means for Solving the Problems

In order to achieve the above described object, according to one aspect of the present invention, there is provided a multiprocessor system having a plurality of processing modules, including a predetermined number, being three or more, of processors, and a bus for relaying data transmission among the respective processing modules, comprising: damaged processor specifying means for specifying at least one damaged processor among the predetermined number of processors; communication restricted processor selecting means for selecting as a communication restricted processor subjected to communication restriction at least one of the processors connected to the bus at a position determined according to a position where the damaged processor is connected to the bus; and communication restriction means for restricting data transmission by the communication restricted processor via the bus.

According to another aspect of the present invention, there is provided a control method for controlling a multiprocessor system having a plurality of processing modules, including a predetermined number, being three or more, of processors, and a bus for relaying data transmission among the respective processing modules, comprising: a step of specifying at least one damaged processor among the predetermined number of processors; a step of selecting as a communication restricted processor subjected to communication restriction at least one of the processors connected to the bus at a position determined according to a position where the damaged processor is connected to the bus; and a step of restricting data transmission by the communication restricted processor via the bus.

According to another aspect of the present invention, there is provided a computer readable information storage medium storing a program to be executed by a multiprocessor system having a plurality of processing modules, including a predetermined number, being three or more, of processors, and a bus for relaying data transmission among the respective processing modules, the program causing the multiprocessor system to function as: damaged processor specifying means for specifying at least one damaged processor among the predetermined number of processors; communication restricted processor selecting means for selecting as a communication restricted processor subjected to communication restriction at least one of the processors connected to the bus at a position determined according to a position where the damaged processor is connected to the bus; and communication restriction means for restricting data transmission by the communication restricted processor via the bus.

According to another aspect of the present invention, there is provided a multiprocessor system having a plurality of processing modules, including a plurality of processors, and a ring type bus for relaying data transmission among the respective processing modules, comprising: table storage means for storing a table showing association between a subset of processors that are some of the plurality of processors and a plurality of processor designation information items each designating any of the subset of processors; damaged processor specifying means for specifying at least one damaged processor among the plurality of processors; and table production means for producing the table such that the processor designation information items each designate any of the plurality of processors, excluding the damaged processor, according to a position where the damaged processor is connected to the ring type bus, wherein each of the subset of processors carries out, based on an application program including a plurality of predetermined processes each associated with any of the processor designation information items, and the table produced, the predetermined process associated with the processer designation information item designating that processor.

According to another aspect of the present invention, there is provided a control method for controlling a multiprocessor system having a plurality of processing modules, including a plurality of processors, and a ring type bus for relaying data transmission among the respective processing modules, comprising: a step of specifying at least one damaged processor among the plurality of processors; and a step of producing a table showing association between a subset of processors that are some of the plurality of processors and a plurality of processor designation information items each designating any of the subset of processors, such that the processor designation information items each designate any of the plurality of processors, excluding the damaged processor, according to a position where the damaged processor is connected to the ring type bus, wherein each of the subset of processors carries out, based on an application program including a plurality of predetermined processes each associated with any of the processor designation information items, and the table produced, the predetermined process associated with the processer designation information item designating that processor.

According to another aspect of the present invention, there is provided a computer readable information storage medium storing a program to be executed by a multiprocessor system having a plurality of processing modules, including a plurality of processors, and a ring type bus for relaying data transmission among the respective processing modules, the program causing the multiprocessor system to function as: damaged processor specifying means for specifying at least one damaged processor among the plurality of processors; and table production means for producing a table showing association between a subset of processors that are some of the plurality of processors and a plurality of processor designation information items each designating any of the subset of processors, such that the processor designation information items each designate any of the plurality of processors, excluding the damaged processor, according to a position where the damaged processor is connected to the ring type bus, wherein each of the subset of processors carries out, based on an application program including a plurality of predetermined processes each associated with any of the processor designation information items, and the table produced, the predetermined process associated with the processer designation information item designating that processor.

BRIEF DESCRIPTION OF THE DRAWINGS

FIG. 5 is a diagram showing one example of a processor association table;

BEST MODE FOR CARRYING OUT THE INVENTION

In the following, one embodiment of the present invention will be described with reference to the accompanying drawings.

Figure 1:
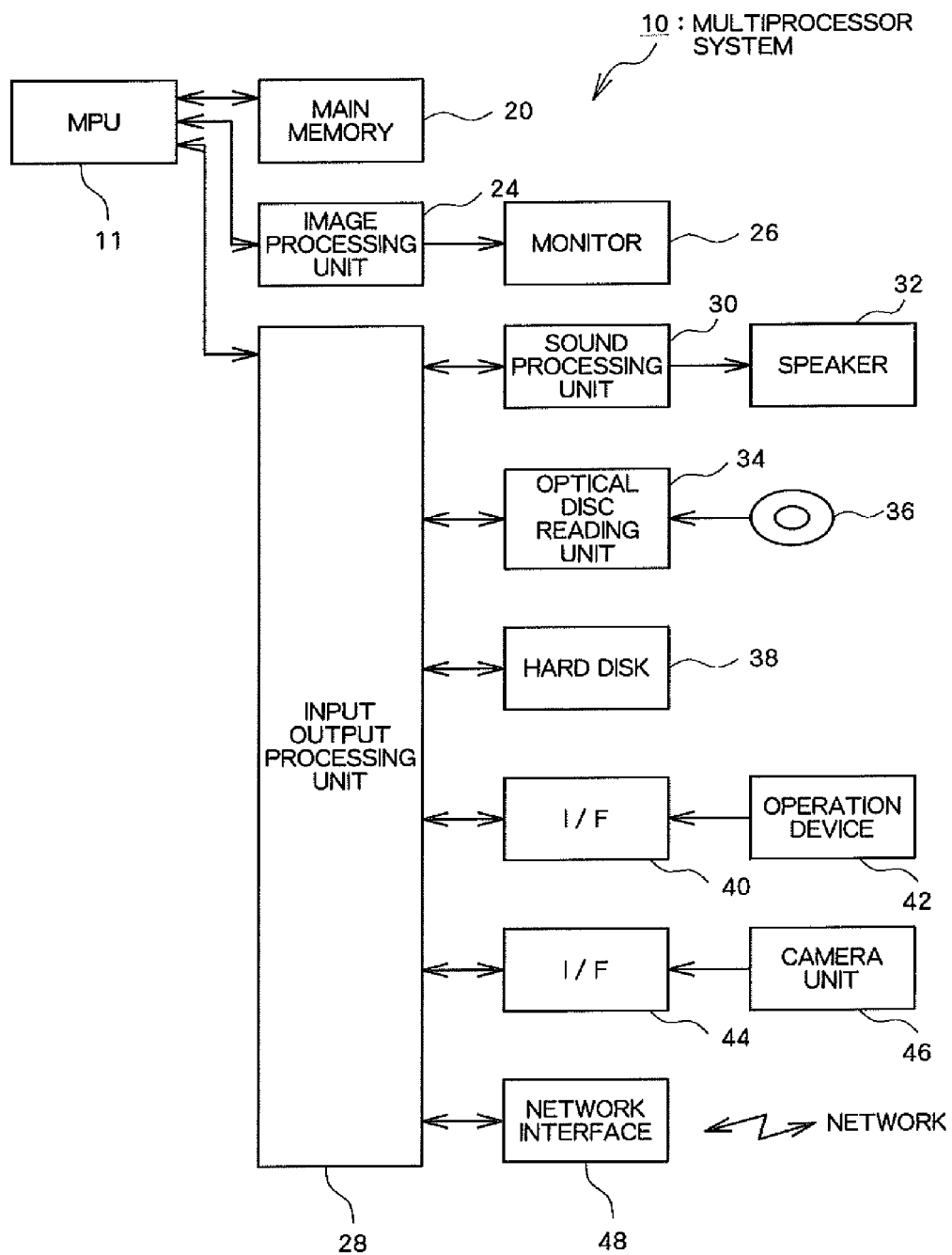
FIG. 1 is a diagram showing a hardware structure of a multiprocessor system according to an embodiment of the present invention.

FIG. 1 is a diagram showing a hardware structure of a multiprocessor system according to this embodiment. As shown, the multiprocessor system 10 is a computer system comprising an MPU (Micro Processing Unit) 11, a main memory 20, an image processing unit 24, a monitor 26, an input output processing unit 28, a sound processing unit 30, a speaker 32, an optical disc reading unit 34, a hard disk 38, interfaces (I/F) 40, 44, an operation device 42, a camera unit 46, and a network interface 48.

Figure 2:
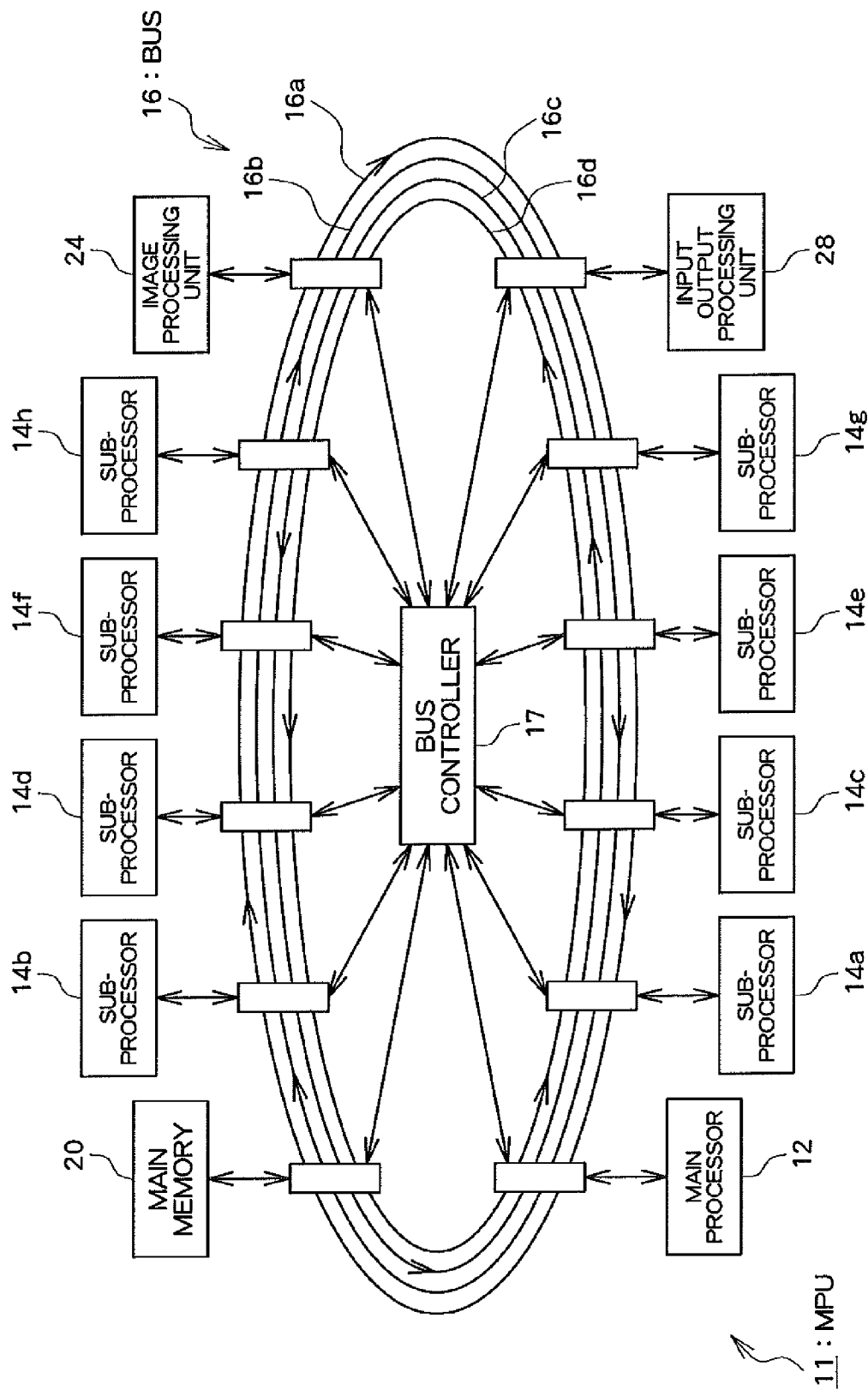
FIG. 2 is a diagram showing a structure of a plurality of processing modules connected to a bus.

FIG. 2 is a diagram showing a structure of the MPU 11. As shown, the MPU 11 comprises a main processor 12, sub-processors 14a, 14b, 14c, 14d, 14e, 14f, 14g, 14h, a bus 16, and a bus controller 17.

Notably, those of the structural elements of the multiprocessor system 10, which carry out data transmission via the bus 16 are hereinafter referred to as processing modules. That is, the multiprocessor system according to this embodiment comprises a plurality of processing modules, including a plurality of processors, and a bus for relaying data exchange among the respective processing modules. Specifically, in this embodiment, as shown in FIG. 2, twelve processing modules, namely the main processor 12, the sub-processors 14a to 14h, the main memory 20, the image processing unit 24, and the input output processing unit 28, are mutually connected via the bus 16 for data exchange.

The main processor 12 carries out various information processes and controls the sub-processors 14a to 14h, based on an operating system stored in a ROM (Read Only Memory) (not shown) and a program and data read from an optical disc 36, such as, e.g., a DVD (Digital Versatile Disk)-ROM, or the like or transmitted via a communication network.

The sub-processors 14a to 14h carry out a variety of information processes according to an instruction from the main processor 12 and based on a program and data or the like read from the optical disc 36, such as, e.g., a DVD-ROM or the like, or supplied via a communication network.

Figure 3:
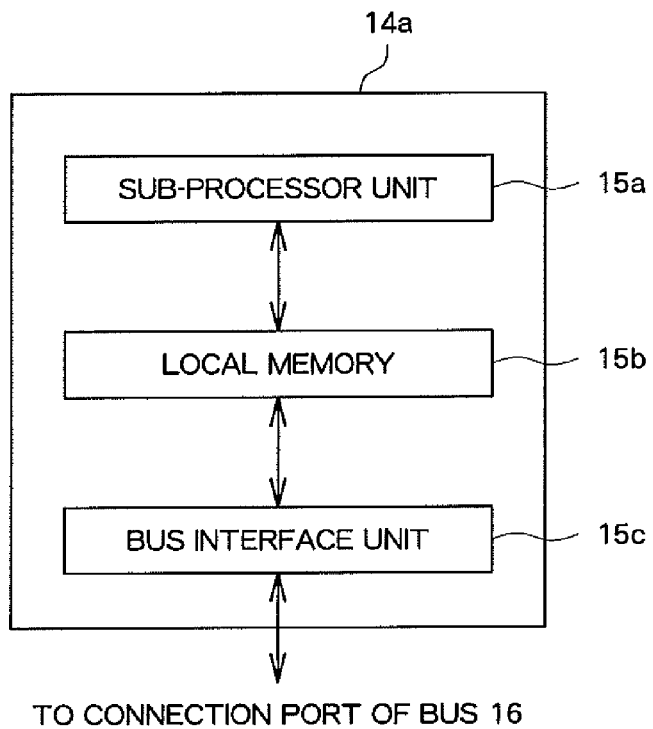
FIG. 3 is a diagram showing a simplified structure of a sub-processor.

Here, a structure of each sub-processor will be described while referring to the sub-processor 14a as an example. Note that the structures of other sub-processors are identical to that of the sub-processor 14a. FIG. 3 is a diagram showing a simplified structure of the sub-processor 14a. As shown, the sub-processor 14a comprises a sub-processor unit 15a, a local memory 15b, and a bus interface unit 15c. The sub-processor unit 15a carries out a program assigned to the sub-processor 14a to carry out information processing, such as calculation or the like. The local memory 15b stores at least a part of the program and data assigned to the sub-processor 14a, and operates as a working memory of the sub-processor unit 15a.

The bus interface unit 15c exchanges data with other processing modules in response to an access request or the like from the sub-processor unit 15a. That is, the bus interface unit 15c relays data transmission between the sub-processor 14a and other processing modules. By way of a specific example, in response to a request (a data writing or reading request) from the sub-processor unit 15a to access an address (a logical address) in a predetermined memory space, the bus interface unit 15c converts the requested logical address into a physical address, with reference to a memory address conversion table held beforehand therein. Note that the physical address is an address here, such as a memory address in the main memory 20 or in a local memory of each sub-processor, and so forth, indicating a physical memory position of each processing module. The bus interface unit 15c also forwards the data sent by the sub-processor unit 15a to the processing module indicated by the converted physical address, or sends a data transmission request to the processing module indicated by the converted physical address and receives data therefrom.

Upon receipt of an access request designating a memory address in the local memory 15b coming from another processing module via the bus 16, the bus interface unit 15c writes data into the local memory 15b, or sends data in the designated local memory 15b to the processing module having sent the access request. With the above, the sub-processor 14a can exchange data with other processing modules via the bus 16.

In response to a request from each processing module, the bus 16 exchanges various data among the respective processing modules. Specifically, according to this embodiment, the bus 16 is a bi-directional ring bus comprising four data transmission paths 16a, 16b, 16c, and 16d. Among these paths, the data transmission paths 16a and 16b always convey data clockwise, while the data transmission paths 16c and 16d always convey data counter-clockwise. Which of the four data transmission paths is to be used for data transmission among the respective processing modules is determined by the bus controller 17. The bus 16 has the same number of connection ports as that of the processing modules connected thereto, so that the respective processing modules are connected to the bus 16 in the respective positions of the corresponding connection ports. That is, each processing module exchanges data with respect to the bus 16 via the corresponding connection port.

The bus controller 17 controls data transmission via the bus 16 among the respective processing modules. By way of a specific example, the bus controller 17, in response to a data transmission request from each processing module, initially determines which of the clockwise and counter-clockwise data transmission paths is to be used for the expected data transmission, based on the position where the sender processing module is connected to the bus 16 and that where the transmission destination processing module is connected to the bus 16. That is, the bus controller 17 determines a data transmission path to use such that data is transmitted in a direction which can reduce the number of processing modules connected to the bus 16 between the sender processing module and the transmission destination processing module. That is, supposing that, e.g., the sub-processor 14a is the sender processing module and any of the main processor 12, main memory 20, sub-processor 14b, sub-processor 14d, and sub-processor 14f is a transmission destination processing module, a lower number of processing modules are connected to the clockwise data transmission path, as shown in FIG. 2. Therefore, the bus controller 17 determines to use either the data transmission path 16a or 16b. On the contrary, when the sub-processor 14a is the sender processing module and the transmission destination processing module is any of the sub-processor 14c, sub-processor 14e, sub-processor 14g, input output processing unit 28, and image processing unit 24, the bus controller 17 decides to send data counter-clockwise, and thus to use either the data transmission path 16c or 16d as a data transmission path.

Further, the bus controller 17 determines which one of the two data transmission paths in the same direction is to be used as a data transmission path, depending on the state of use of the respective data transmission paths at the time when the data transmission request is made, and so forth. Notably, when the same number of processing modules are connected to the clockwise and counter-clockwise data transmission paths, respectively, between the data sender and the data receiver (e.g., data transmission from the sub-processor 14a to the sub-processor 14h), either of the clockwise and counter-clockwise data transmission paths can be used. That is, the bus controller 17 determines a data transmission path to use among the four data transmission paths, depending on the state of use or the like. According to the determination made by the bus controller 17, each processing module carries out data transmission with respect to other processing modules, using any data transmission path.

The main memory 20 comprises a memory element, such as a RAM or the like, and a memory controller for relaying data transmission between the memory element and the bus 16. A program and data read from the optical disc 36 and/or the hard disk 38 or supplied via communication network is written into the main memory 20, when necessary. The main memory 20 is used also as a working memory of the main processor 12 and sub-processors 14a to 14h.

The image processing unit 24 comprises a GPU (Graphics Processing Unit) and a frame buffer. The GPU renders various screen images into the frame buffer, based on the data sent from the main processor 12 and/or sub-processors 14a to 14h. The screen image rendered in the frame buffer is converted into a video signal and output to the monitor 26 at a predetermined timing. Notably, the monitor 26 may be a home-use television set receiver.

The input output processing unit 28 is connected to the sound processing unit 30, optical disc reading unit 34, hard disk 38, interfaces 40 and 44, and network interface 48. The input output processing unit 28 controls data exchange between the main processor 12 and sub-processors 14a to 14h and the sound processing unit 30, optical disc reading unit 34, hard disk 38, interfaces (I/F) 40 and 44, and network interface 48.

The sound processing unit 30 includes an SPU (Sound Processing Unit) and a sound buffer. In the sound buffer, various sound data, such as game music, game sound effect, a message, and so forth, read from the optical disc 36 or the hard disk 38, are stored. The SPU reproduces the various sound data and outputs via the speaker 32. The speaker 32 may be, e.g., a built-in speaker of a home-use television set receiver.

The optical disc reading unit 34, in response to an instruction from the main processor 12 and sub-processors 14a to 14h, reads a program and data from the optical disc 36. The multiprocessor system 10 may be formed capable of reading a program and data from any computer readable information storage medium other than the optical disc 36.

The optical disc 36 is a typical optical disc (a computer readable information storage medium), such as, e.g., a DVD-ROM, or the like. The hard disk 38 is a typical hard disk device. In the optical disc 36 and/or hard disk 38, various programs and data are stored in a computer readable manner.

The interfaces (I/F) 40, 44 are used for connecting various peripheral devices, such as the operation device 42, the camera unit 46, and so forth. The interface may be, e.g., a USB (Universal Serial Bus) interface or a radio communication interface according to, e.g., Bluetooth (registered trademark) standard.

The operation device 42 is a general purpose operation input means for use by a user to input various operations (e.g., a game operation). The input output processing unit 28 scans the states of the respective units of the operation device 42 every predetermined period of time (e.g., every 1/60th of a second), and supplies an operational signal describing the scanning result to the main processor 12 and/or sub-processors 14a to 14h. The main processor 12 and/or sub-processors 14a to 14h determine the content of operation carried out by the user, based on an operational signal thereof. Notably, the multiprocessor system 10 is formed adapted to connection to a plurality of operation devices 42, so that the main processor 12 and/or sub-processors 14a to 14h carry out various processes, based on operational signals input from the respective operation devices 42.

The camera unit 46 comprises, e.g., a publicly known digital camera, and receives a black/white, grey scaled, or colored captured image every predetermined period of time (e.g., every 1/60th of a second). The camera unit 46 according to this embodiment inputs a captured image as image data according to JPEG (Joint Photographic Experts Group) format. For example, the camera unit 46 is placed on the monitor 26 with the camera lens thereof directed to the user, and connected via a cable to the interface 44. The network interface 48 is connected to the input output processing unit 28 and the communication network, relaying data transmission by the multiprocessor system 10 with respect to other information devices via a communication network.

Figure 4:
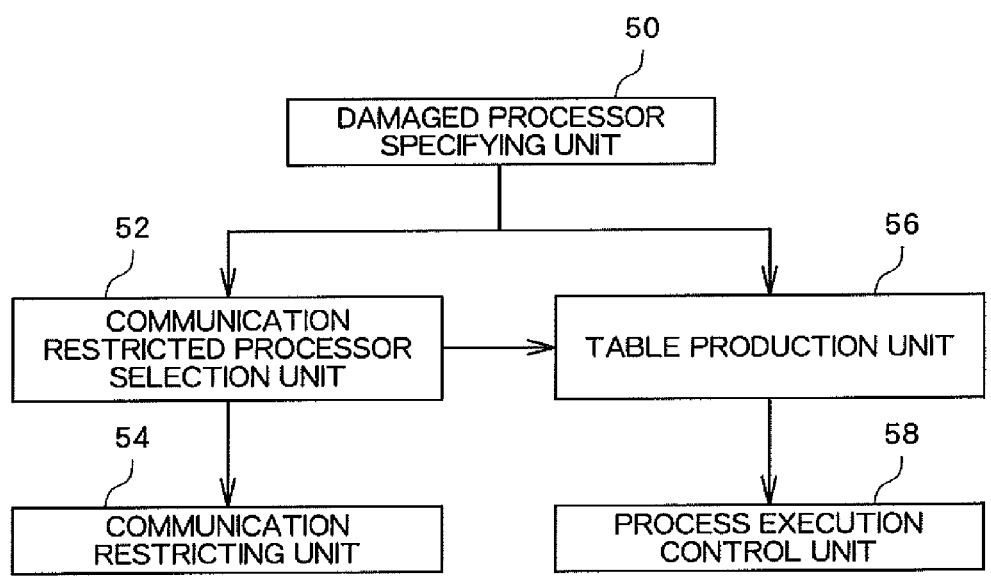
FIG. 4 is a functional block diagram showing an example function of a multiprocessor system according to the embodiment of the present invention.

In the following, functions realized by the thus structured multiprocessor system 10 when any of the sub-processors 14a to 14h is damaged will be described. As shown in FIG. 4, the multiprocessor system 10 comprises, in terms of functions, a damaged processor specifying unit 50, a communication restricted processor selection unit 52, a communication restricting unit 54, a table production unit 56, and a process execution control unit 58. These functions are realized, e.g., by the MPU 11 executing a program stored in a ROM (not shown) and/or the main memory 20, or the like. The program may be provided stored in a computer readable information storage medium, such as the optical disc 36 or the like, or via a communication network, such as the Internet, or the like.

The damaged processor specifying unit 50 specifies at least one sub-processor that is damaged (hereinafter referred to as a damaged processor) among the sub-processors 14a to 14h. The damaged processor may be a sub-processor whose damage was found during manufacture of the MPU 11 or one which is damaged during use and thereby becomes incapable of normal operation. The damaged processor may alternatively be a sub-processor imposed with a use restriction when shipping the device or the like. By way of a specific example, the multiprocessor system 10 according to this embodiment may hold damaged processor identification information specifying a damaged processor, stored beforehand in a non-volatile memory (not shown), and the damaged processor specifying unit 50 reads the damaged processor identification information from the nonvolatile memory to specify a damaged processor. Also, the damaged processor specifying unit 50 may carry out a predetermined hardware diagnosis program when the multiprocessor system 10 is powered on, or the like, to thereby specify a damaged processor. The damaged processor specifying unit 50 may update the damaged processor identification information stored in the nonvolatile memory, according to the result of execution of the diagnosis program, or the like, and specify a damaged processor, based on the updated damaged processor identification information.

The communication restricted processor selection unit 52 selects a sub-processor to be subjected to communication restriction (hereinafter referred to as a communication restricted processor) from among the sub-processors 14a to 14h, depending on the damaged processor specified by the damaged processor specifying unit 50. Specifically, the communication restricted processor selection unit 52 selects as a communication restricted processor at least one sub-processor connected to the bus 16 at a position (a connection position) determined according to where the damaged processor is connected to the bus 16.

The number of sub-processors selected as communication restricted processors may be determined depending on the number (eight, here) of sub-processors equipped to the multiprocessor system 10, that of sub-processors used when the multiprocessor system 10 carries out an application program, and that of damaged processors. Supposing that six sub-processors are used in execution of an application program and one damaged processor exists, the number that results when subtracting these numbers from the number of sub-processors equipped to the multiprocessor system 10, that is, 1 (=8−6−1), is the number of sub-processors to be selected as communication restricted processors. Alternatively, the number of communication restricted processors may be determined such that the sum of the number of damaged processors and that of communication restricted processors amounts to a predetermined value.

In the following, a specific example of a method for the communication restricted processor selection unit 52 to select a communication restricted processor from among the sub-processors 14a to 14h will be described.

By way of an example, the communication restricted processor selection unit 52 selects a communication restricted processor such that a smaller difference results between the numbers of processing modules connected to the bus 16 between where the damaged processor is connected to the bus 16 and where the communication restricted processor is connected to the bus 16. That is, suppose that, e.g., one damaged processor and one communication restricted processor exist. In this case, the sub-processor connected to the bus 16 in the most remote position on the path of the bus 16 (that is, the opposite position in the ring) from where the damaged processor is connected to the bus 16 is selected as a communication restricted processor. Specifically, in the example of FIG. 2, with respect to the sub-processor 14a being a damaged processor, the sub-processor 14h is selected as a communication restricted processor. Likewise, with respect to the sub-processor 14b being a damaged processor, the sub-processor 14g is selected as a communication restricted processor; with respect to the sub-processor 14c, the sub-processor 14f is selected; with respect to the sub-processor 14d, the sub-processor 14e is selected. Such combination of the damaged processor and the communication restricted processor described above can also be applied if the damaged processor and the communication restricted processor are switched. That is, with respect to, e.g., the sub-processor 14h being a damaged processor, the sub-processor 14a is selected as a communication restricted processor.

With a communication restricted processor selected in the manner described above, five processing modules are left connected to the bus 16 between where the damaged processor is connected to the bus 16 and where the communication restricted processor is connected to the bus 16 on each of the clockwise path and the counter-clockwise path, with the difference of the numbers being zero. Even when an odd number of processing modules are connected to the bus 16, or two or more communication restricted processor are selected, with a communication restricted processor selected such that the difference of the numbers of processing modules connected to the bus 16 between where the damaged processor is connected to the bus 16 and where the communication restricted processor is connected to the bus 16 on each of the paths is made smaller, the damaged processor and communication restricted processor are resultantly connected to the bus 16 at the respective positions remote from each other. With the above, the position where the damaged processor for no data transmission via the bus 16 is connected to the bus 16 and that where the communication restricted processor for restricted data transmission via the bus 16 is connected to the bus 16 can be set apart from each other, and data transmission via a ring bus by the respective processing modules, excluding these sub-processors, can be made uniform.

Alternatively, the communication restricted processor selection unit 52 may select a communication restricted processor, based on the position where a predetermined processing module (hereinafter referred to as a focused processing module) among the plurality of processing modules involved in the multiprocessor system 10 is connected to the bus 16. By way of a specific example, the communication restricted processor selection unit 52 selects as a communication restricted processor a sub-processor carrying out data transmission to the focused processing module, using a data transmission path, among the plurality of data transmission paths of the bus 16, different from the path to be used in data transmission from the damaged processor to the focused processing module.

For example, the focused processing module is a processing module, such as the main memory 20, the image processing unit 24, or the like, which is expected to carry out a large amount of data transmission with respect to the respective sub-processors. Here, by way of a specific example, a case with the main memory 20 being the focused processing module will be described. In this case, the clockwise data transmission path 16a or 16b is used for data transmission from the sub-processors 14a, 14c, 14e, and 14g to the main memory 20, as described above. These four sub-processors are hereinafter collectively referred to as a first sub-processor group. Meanwhile, the counter-clockwise data transmission path 16c or 16d is used for data transmission from the sub-processors 14b, 14d, 14f, and 14h to the main memory 20. These four sub-processors are hereinafter collectively referred to as a second sub-processor group.

Supposing that the main memory 20 is the focused processing module and one damaged processor and one communication restricted processor exist, the communication restricted processor selection unit 52 selects a communication restricted processor from those belonging to the second sub-processor group when the damaged processor belongs to the first sub-processor group, and from those belonging to the first sub-processor group when the damaged processor belongs to the second sub-processor group. With the above, the same number, or three here, of sub-processors among those excluding the damaged processor and communication restricted processor are left belonging to the first and second sub-processor groups, respectively. With the above, restriction of data transmission via the bus 16 by the communication restricted processor as will be described later enables dispersing of data transmission among the main memory 20, or the focused processing module, and the sub-processors, excluding the damaged and communication restricted processors, over the plurality of data transmission paths. This makes it unlikely that the data transmission will be unevenly carried out by some data transmission paths. Note that the communication restricted processor which is connected to the bus 16 most remote from the damaged processor in the above is the one belonging to a sub-processor group different from that to which the damaged processor belongs.

For a case involving two or more damaged or communication restricted processors, the communication restricted processor selection unit 52 may select a communication restricted processor such that a smaller difference results between the numbers of sub-processors belonging to the first and second sub-processors, respectively, excluding the damaged and communication restricted processors.

Notably, although selection of a communication restricted processor when a damaged processor exists, that is, selection depending on the position where the damaged processor is connected to the bus 16, is described above, the communication restricted processor selection unit 52 may select a communication restricted processor even when no damaged processor is specified by the damaged processor specifying unit 50. In this case, the number of communication restricted processors may be determined based on the number of sub-processors equipped to the multiprocessor system 10 and that of sub-processors used when the multiprocessor system 10 carries out an application program. In the above, a predetermined sub-processor may be selected as a communication restricted processor. By way of a specific example, the communication restricted processor selection unit 52 may select as a communication restricted processor a predetermined sub-processor, such as a sub-processor whose temperature is likely to rise due to the circuit placement of the multiprocessor system 10, or the like, which is determined depending on the environment in which the multiprocessor system 10 is used.

The communication restricting unit 54 restricts data transmission via the bus 16 by the communication restricted processor selected by the communication restricted processor selection unit 52. As a specific example, the communication restricting unit 54 may restrict program execution by the communication restricted processor, to thereby restrict data transmission by the communication restricted processor. In this case, the communication restricted processor does not carry out data transmission with other processing modules, similar to a damaged processor. Alternatively, the data transmission band for data transmission with respect to the bus 16 by the bus interface unit 15c in the communication restricted processor may be restricted to below a predetermined value, while keeping the communication restricted processor carrying out an application program, to thereby restrict the data transmission.

Still alternatively, the communication restricting unit 54 may cause the communication restricted processor to carry out a predetermined program (hereinafter referred to as a system program), to thereby restrict data transmission by the communication restricted processor. In the above, the system program is a program, stored beforehand in the ROM or the like in the multiprocessor system 10, of a kind different from that of an application program to be carried out by other sub-processors. In addition, the system program is of a kind such that the amount of data the sub-processor executing that system program exchanges with other processing modules is smaller than that the same sub-processor executing the application program does. In particular, when the system program is independent of other application programs, the communication restricted processor engaged with the system program need not exchange data with other sub-processors. That is, the communication restricting unit 54 restricts data transmission by the communication restricted processor by causing the processor to carry out such a system program. Notably, the system program may be activated directly from, and carried out under control of, the operating system. With this arrangement, the amount of data involved in data transmission by the sub-processor carrying out a system program can be more readily controlled, compared to a case of an application program.

As described above, with selection, as a communication restricted processor, of a sub-processor connected to the bus 16 at a position determined according to the position where the damaged processor is connected to the bus 16 and restriction of data transmission via the bus 16 by the selected communication restricted processor, the multiprocessor system 10 can ensure uniform load due to data transmission within the bus 16 so that data transmission efficiency is less affected by the position where the damaged processor is connected to the bus 16.

The table production unit 56 produces a processor association table which shows association between some of the sub-processors 14*a* to 14*h* and a plurality of processor designation information items, each designating any of the some of the sub-processors 14*a* to 14*h*. The processor association table may be stored beforehand in the main memory 20 or the like in the multiprocessor system 10, and updated by the table production unit 56. The processor designation information is information designating any sub-processor in the multiprocessor system 10, and is expressed as a logical processor number being, e.g., an integer equal to or larger than zero. In this case, the number of processor designation information items corresponds to the number of sub-processors used when carrying out an application program, being smaller than the number (eight, here) of sub-processors equipped to the multiprocessor system 10. FIG. 5 is a diagram showing an example of a processor association table in which six logical processor numbers, namely, zero to five, are associated with the respective sub-processors, whereby each designates any of the sub-processors.

The table production unit 56 produces the processor association table such that each processor designation information item designates any of the plurality of sub-processors except the damaged processor, according to the position where the damaged processor is connected to the bus 16. In the case where any sub-processor is selected by the communication restricted processor selection unit 52 as a communication restricted processor, the table production unit 56 may produce the processor association table such that each processor designation information item designates any of the plurality of sub-processors except the damaged processor and the communication restricted processor, according to the positions where the damaged processor and the communication restricted processor are connected to the bus 16. Further, in the case where the communication restricted processor is arranged to carry out a predetermined system program, such as, e.g., the above-described case, the processor association table may be produced such that a predetermined specific processor designation information item among the plurality of processor designation information items designates a communication restricted processor.

As a specific example, the table production unit 56 determines the sub-processors from among the plurality of sub-processors excluding the damaged processor, which are to be designated by the respective processor designation information items according to the positions where the respective sub-processors except the damaged processors are connected to the bus 16. For example, when the damaged processor belongs to the first sub-processor group, it is first determined that the logical processor number 0 designates the sub-processor 14*b*, followed by determination of the sub-processors to be designated by the respective logical processor numbers, in which the latter determination is made such that the positions where the respective designated sub-processors are connected to the bus 16 are aligned clockwise. Meanwhile, when the damaged processor belongs to the second sub-processor group, it is first determined that the logical processor number 0 designates the sub-processor 14*a*, followed by determination of the sub-processors to be designated by the respective logical processor numbers, in which the latter determination is made such that the positions where the respective designated sub-processors are connected to the bus 16 are aligned counter-clockwise.

Figure 6:
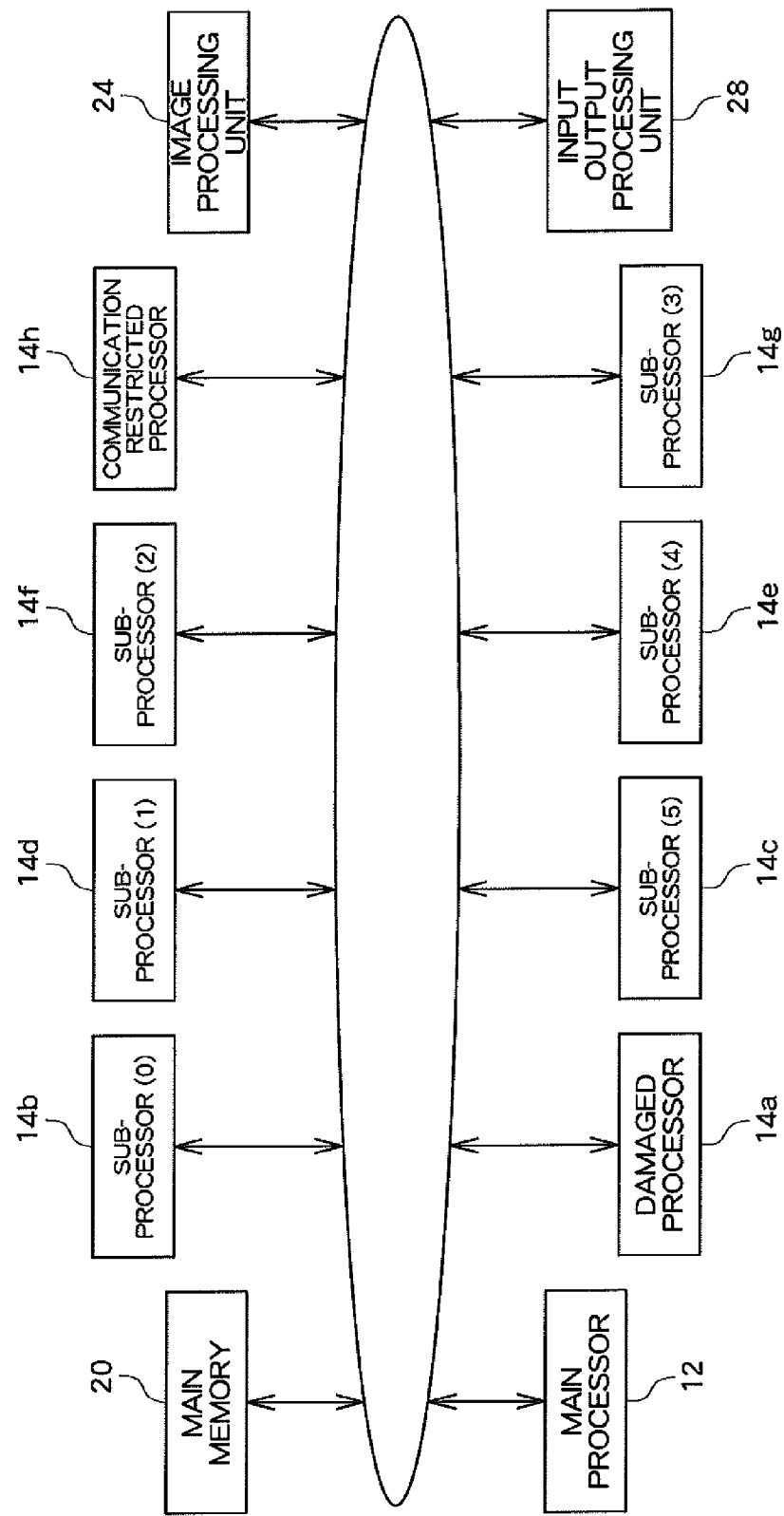
FIG. 6 is a diagram explaining an example of a positional relationship among sub-processors designated by processor designation information.
Figure 7:
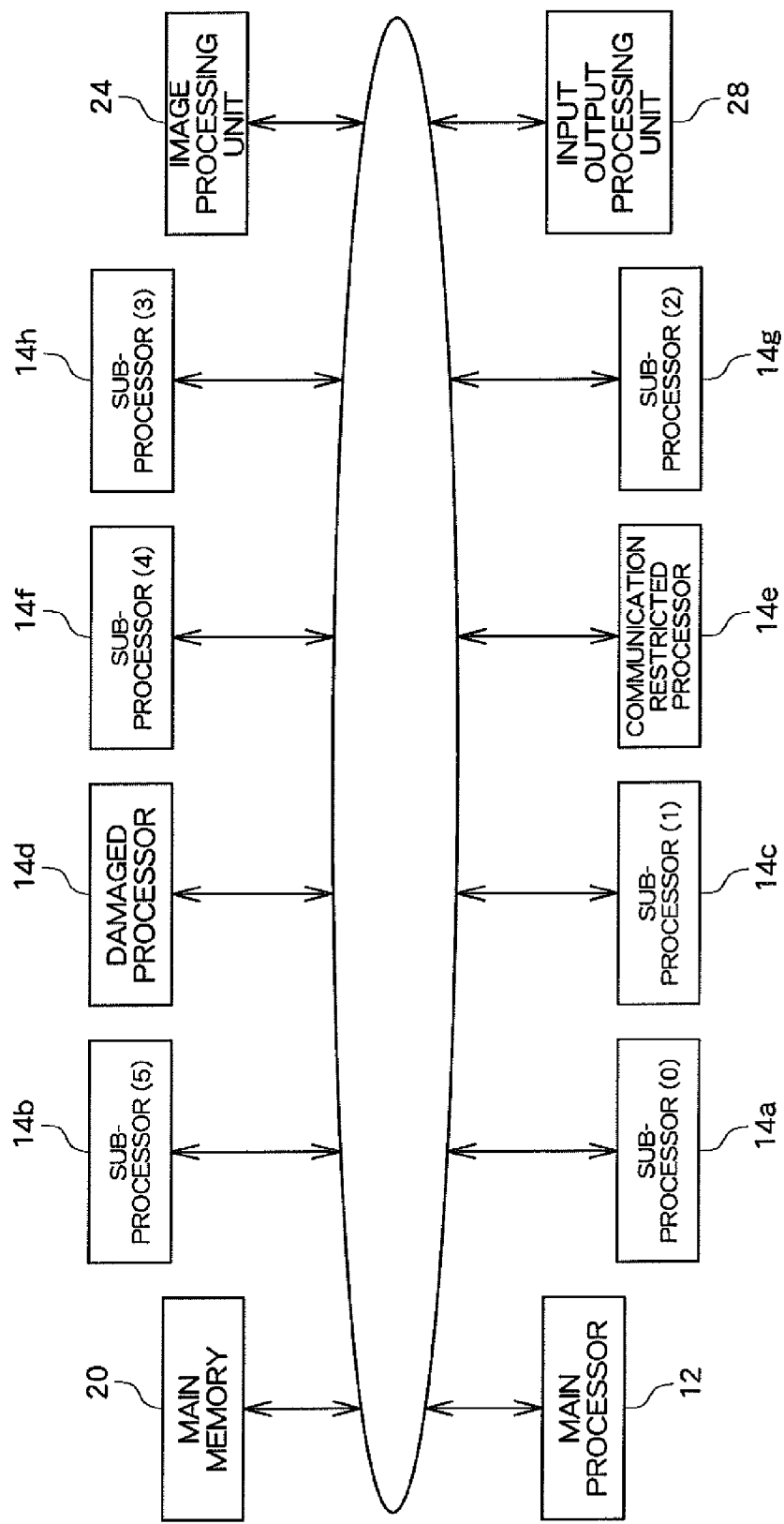
FIG. 7 is a diagram explaining another example of a positional relationship among sub-processors designated by processor designation information.

FIGS. 6 and 7 are diagrams explaining a positional relationship among the sub-processors designated by the respective logical processor numbers determined as described above. In the drawings, a positional relationship among the processing modules connected to the bus 16, shown in FIG. 2, is shown simplified. Notably, in FIGS. 6 and 7, the processor designation information are expressed by six logical processor numbers, namely zero to five, in which the sub-processor designated by the logical processor number n is denoted as sub-processor (n). FIG. 6 shows an example in which the sub-processor 14*a* is a damaged processor and the sub-processor 14*h* is selected as a communication restricted processor. FIG. 7 shows an example in which the sub-processor 14*d* is a damaged processor and the sub-processor 14*e* is selected as a communication restricted processor.

By determining the sub-processors to be designated by the respective logical processor numbers according to the positions where the sub-processors are connected to the bus 16, as described above, it is possible to ensure an identical positional relationship among the positions where the sub-processors are connected to the bus 16, when viewed from any sub-processor designated by a certain logical processor number, regardless of which sub-processor is a damaged processor. Specifically, for example, when data is transmitted from the sub-processor (0) to other sub-processors designated by other logical processor numbers in FIG. 6, a clockwise data transmission path is used for data transmission to the sub-processors (1) and (2); a counter-clockwise data transmission path is used for data transmission to the sub-processors (5) and (4); either of the clockwise and counter-clockwise data transmission path can be used for data transmission to the sub-processor (3). Meanwhile, for data transmission from the sub-processor (0) to the other sub-processors designated by the other logical processor numbers in FIG. 7, a counter-clockwise data transmission path is used for data transmission to the sub-processors (1) and (2); and a clockwise data transmission path is used for data transmission to the sub-processors (5) and (4). For data transmission to the sub-processor (3), a data transmission path in either direction is usable, similar to the case shown in FIG. 6. Except that the directions of the transmission paths are reversed, combinations of the sub-processors to which data is transmitted via a data transmission path in the same direction are identical between the examples shown in FIGS. 6 and 7. With this arrangement, a constant environment for data transmission between the respective sub-processors carrying out an application program can be ensured regardless of which sub-processor is damaged, when a task of execution of a predetermined process contained in an application program is allocated to the respective sub-processors according to the logical processor numbers, as will be described later.

Further, the determination by the table production unit 56, of sub-processors to be designated by the processor designation information items from among those except the damaged processor, may be made according to the positional relationship among the positions where the respective sub-processors, excluding the damaged processor, is connected to the bus 16 and the position where a predetermined processing module, among the plurality of processing modules, is connected to the bus 16, in which the predetermined processing module may be the focused processing module used in the above described selection of a communication restricted processor by the communication restricted processor selection unit 52.

Figure 8:
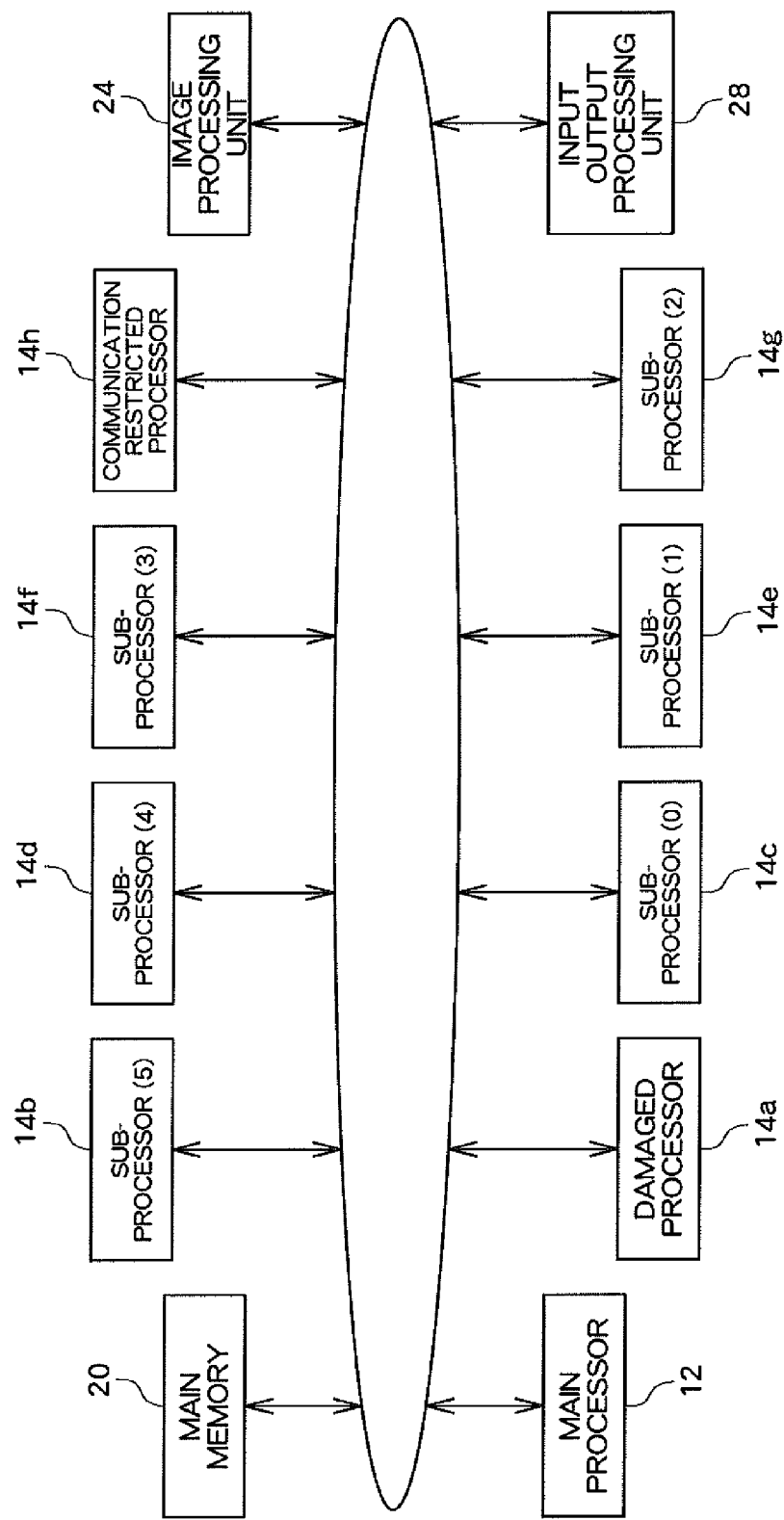
FIG. 8 is a diagram explaining another example of a positional relationship among sub-processors designated by processor designation information.

As a specific example of this case, when, e.g., the main memory 20 is the focused processing module, the table production unit 56 determines sub-processors to be designated by the logical processor numbers such that the positions where the respective designated sub-processors are connected to the bus 16 are aligned counter-clockwise, beginning with where the main memory 20 is connected to the bus 16. FIG. 8 is a diagram explaining a positional relationship among the connection positions of the sub-processors designated by the thus determined respective logical processor numbers when the sub-processor 14*a* is a damaged processor and the sub-processor 14*h* is a communication restricted processor, similar to FIG. 6.

By determining the sub-processors to be designated by the logical processor numbers according to the positional relationship among the connection positions of the sub-processors and that of the focused processing module, as described above, it is possible to maintain unchanged the data transmission direction from the focused processing module to the respective sub-processors designated by the logical processor numbers regardless which sub-processor is a damaged processor. In the example shown in FIG. 8, for example, a counter-clockwise data transmission path is used for data transmission from the main memory 20 to the sub-processors (0), (1), and (2), while a clockwise data transmission path is used for data transmission from the main memory 20 to the sub-processors (5), (4), and (3). This correspondence relationship remains unchanged no matter which sub-processor is damaged.

In addition, the order of data propagation distances for the respective sub-processors designated by the respective logical processor numbers when data is transmitted from the focused processing modules remains unchanged, irrespective of the connection position of the damaged processor. For example, in the example shown in FIG. 8, in which the sub-processor (0) is connected closest to the main memory 20, among the sub-processors to which data is transmitted from the main memory 20 through the counter-clockwise data transmission path, the sub-processor (1) is the second closest, and the sub-processor (2) is the third closest, the data travels by progressively longer distances through the bus 16, in this order, and the order remains the same regardless of which sub-processor is damaged. With the above, the amount of transmission data between the focused processing module and the respective sub-processors carrying out an application program is less affected by the position of the damaged processor.

Based on an application program read from, e.g., the optical disc 36 and/or the hard disk 38 or the like and then stored in the main memory 20, and also the processor association table produced by the table production unit 56, the process execution control unit 58 controls each of the sub-processors designated by the respective processor designation information items so as to carry out a predetermined process which is a part of the application program. The application program in this case contains a plurality of predetermined processes, each associated with any of the processor designation information items. Each of the plurality of predetermined processes is the unit of program execution and assigned to each sub-processor, and a plurality of predetermined processes are carried out in parallel. Each of the sub-processors designated by the processor designation information items carries out a predetermined process associated with the processor designation information item which designates that sub-processor, under control by the process execution control unit 58.

By way of a specific example, the process execution control unit 58 produces a memory address conversion table showing association between a logical address determined beforehand so as to correspond to a logical processor number and a physical address indicating a memory position of a sub-processor designated by the logical processor number. The produced memory address conversion table is distributed to the bus interface unit 15*c* in each sub-processor, so that each sub-processor can access, using a logical processor number, the sub-processor designated by the logical processor number. Also, while referring to the memory conversion table, the main memory 20 can send program data for a predetermined process to a sub-processor designated by each logical processor number so that the sub-processor carries out the predetermined process.

As described above, the multiprocessor system 10 determines the sub-processors to be designated by the respective processor designation information items, according to the position where the damaged processor is connected to the bus 16, and each sub-processor carries out a predetermined process associated with the processor designation information item which designates that sub-processor. With this arrangement, the positional relationship among the sub-processors carrying out the respective predetermined processes can remain relatively constant despite difference in position where a damaged processor is connected to the bus 16. This can make it less likely that the program execution environment will change, and reduce difference in program processing speed or the like due to individual differences of each device.

Figure 9:
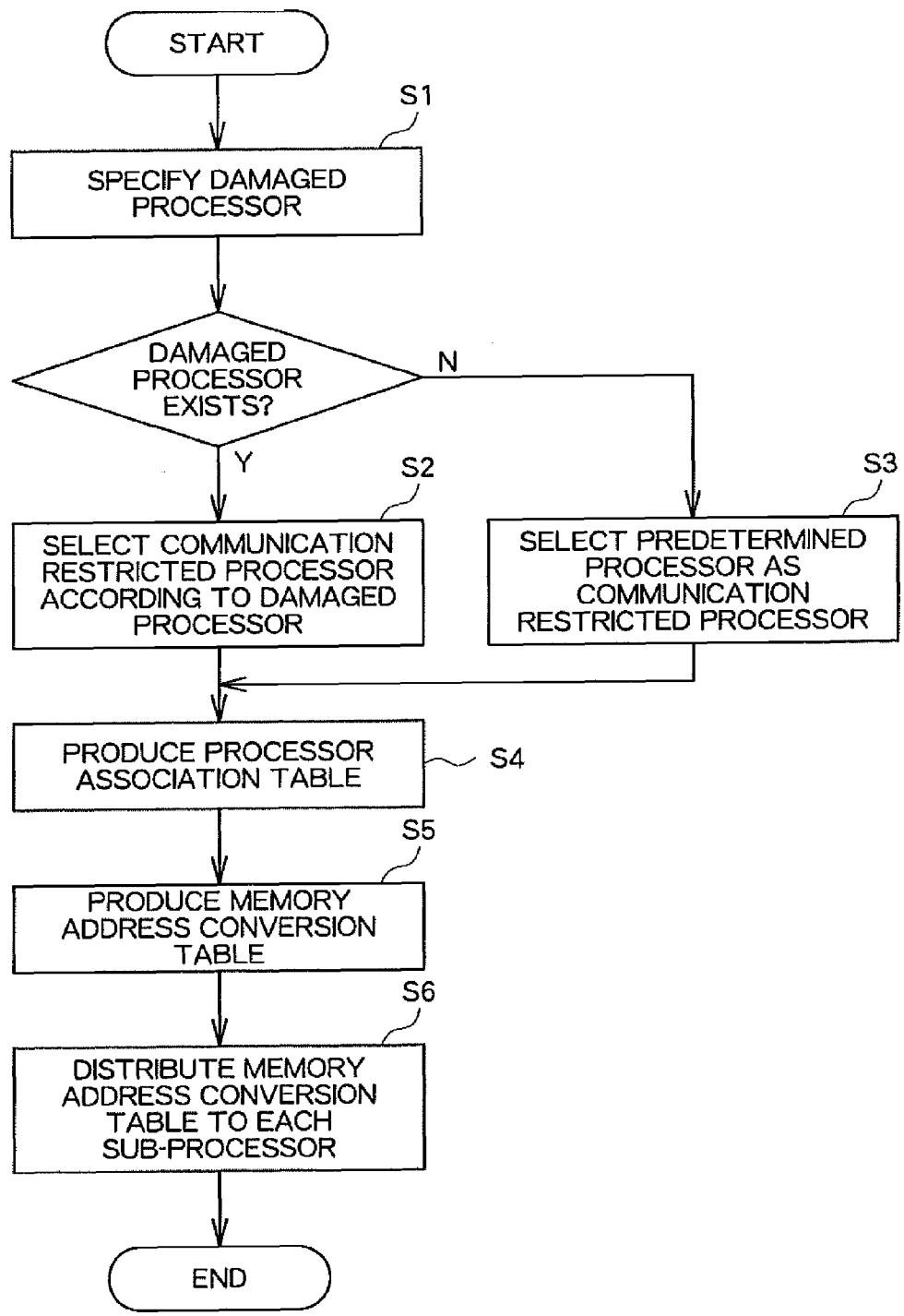
FIG. 9 is a flowchart of one example of a process to be carried out by the multiprocessor system according to the embodiment of the present invention.

Here, one example of a flow of a process to be carried out by the multiprocessor system 10 will be described based on the flowchart shown in FIG. 9. The process shown in the diagram is carried out when, e.g., the multiprocessor system 10 is powered on, or the like.

Initially, the multiprocessor system 10 reads damaged processor identification information from the nonvolatile memory, and specifies a damaged processor (S1). When any damaged processor exists, a communication restricted processor is selected according to the connection position of the damaged processor (S2). It is determined here that one sub-processor connected on the path of the bus 16 at a position most remote from where the damaged processor is connected to the bus 16 is selected as a communication restricted processor. When no damaged processor exists, on the other hand, the multiprocessor system 10 selects a predetermined sub-processor as a communication restricted processor (S3).

Then, the multiprocessor system 10 produces a processor association table according to the damaged processor specified at S1, and the communication restricted processor selected at S2 or S3 (S4). Further, a memory address conversion table is produced, based on the communication restricted processor selected at S2 or S3 and the processor association table produced at S4 (S5), and the produced memory address conversion table is distributed to the bus interface unit 15*c* of each sub-processor (S6). Notably, the processes at S1 to S6 may be carried out by an operating system running in the multiprocessor system 10.

In the above, the memory address conversion table produced at S5 is an address conversion table showing association between a logical address corresponding to a logical processor number and a physical address indicating a sub-processor designated by the logical processor number, and also association between a predetermined logical address into which a predetermined system program is read and a physical address indicating a communication restricted processor. With the memory address conversion table distributed to the bus interface units 15c of the respective sub-processors, the communication restricted processor can carry out a system program, while each sub-processor designated by the logical processor number carries out a predetermined process which is a part of the application program associated with the logical processor number.

Notably, the present invention is not limited to the above described embodiment, and various modified embodiments are applicable. For example, even when a plurality of processors are connected to a bus of any type other than a ring type, as long as the bus comprises a plurality of data transmission paths, the multiprocessor system 10 may select a communication restricted processor such that a smaller difference results between the numbers of processors carrying out data transmission with respect to the focused processing module via the respective data transmission paths. With the above, the amount of transmission data can be dispersed evenly over the plurality of data transmission paths, so that data transmission efficiency can be improved. Notably, the multiprocessor system according to the present invention may be various kinds of information processing devices having a plurality of processors of the same type.

The communication restricted processor selection unit 52 may determine the number of processors to be selected as communication restricted processors, according to the number of damaged processors specified by the damaged processor specifying unit 50. For example, the communication restricted processor selection unit 52 selects a communication restricted processor such that the number of communication restricted processors becomes equal to that of damaged processors. In this case, when the sub-processors are grouped into a plurality of sub-processor groups according to the data transmission path used in data transmission with respect to the focused processing module, as described above, the communication restricted processor selection unit 52 may select a communication restricted processor such that the same number of sub-processors, excluding the damaged processor and communication restricted processor, are included in the respective sub-processor groups. Also, the sub-processor connected to the ring type bus at a position opposite from the connection position of each damaged processor may be selected as a communication restricted processor.

The invention claimed is:

1. A multiprocessor system, comprising:
a plurality of processing modules, including a predetermined number, being three or more, of processors,
a bus for relaying data transmission among the respective processing modules,
a plurality of data transmission paths within the bus, such that the predetermined number of processors carry out data transmission with respect to a predetermined processing module among the plurality of processing modules, respectively, using any of the plurality of data transmission paths,
damaged processor specifying means for specifying at least one damaged processor among the predetermined number of processors;
communication restricted processor selecting means for selecting as a communication restricted processor subjected to communication restriction at least one of the processors connected to the bus at a position determined according to a position where the damaged processor is connected to the bus such that the at least one processor carries out data transmission with respect to the predetermined processing module, using a data transmission path, among the plurality of data transmission paths, different from a data transmission path to be used in data transmission from the damaged processor to the predetermined processing module; and
communication restriction means for restricting data transmission by the communication restricted processor via the bus.

2. The multiprocessor system according to claim 1, wherein
the bus is a ring type bus, and
the communication restricted processor selecting means selects the communication restricted processor such that the difference of the numbers of the processing modules connected to the bus between the position where the damaged processor is connected to the bus and a position where the communication restricted processor is connected to the bus is made smaller.

3. The multiprocessor system according to claim 1, wherein the communication restriction means restricts execution of a program by the communication restricted processor, to thereby restrict the data transmission by the communication restricted processor.

4. The multiprocessor system according to claim 1, further comprising:
means for storing a predetermined program;
wherein the communication restriction means causes the communication restricted processor to execute the predetermined program, to thereby restrict the data transmission by the communication restricted processor.

5. The multiprocessor system according to claim 1, wherein
the bus is a ring type bus, and
the multiprocessor system further comprises:
table storage means for storing a table showing association between a subset of processors which are some of the predetermined number of processors and a plurality of processor designation information items each designating any of the subset of processors, and
table production means for producing the table such that the processor designation information items each designate any of the processors among the predetermined number of processors, excluding the damaged processor, according to a position where the damaged processor is connected to the ring type bus, and
each of the subset of processors carries out, based on an application program including a plurality of predetermined processes each associated with any of the processor designation information items, and the table produced, the predetermined process associated with the processer designation information item designating that processor.

6. The multiprocessor system according to claim 5, wherein the table production means determines, according to a position where each of the processors, excluding the damaged processor, is connected to the bus, processors to be designated by the respective processor designation information items from among the predetermined number of processors, excluding the damaged processor.

7. The multiprocessor system according to claim 6, wherein the table production means determines, according to positional relationship among positions where the processors, excluding the damaged processor, are connected to the ring type bus and a position where a predetermined processing module among the plurality of processing modules is connected to the ring type bus, processors to be designated by the respective processor designation information items from among the predetermined number of processors, excluding the damaged processor.

8. A control method for controlling a multiprocessor system having a plurality of processing modules, including a predetermined number, being three or more, of processors, and a bus for relaying data transmission among the respective processing modules, comprising:
   a step of facilitating data transmission between the predetermined number of processors and a predetermined processing module among the plurality of processing modules via one or more of a plurality of data transmission paths comprised within the bus,
   a step of specifying at least one damaged processor among the predetermined number of processors;
   a step of selecting as a communication restricted processor subjected to communication restriction at least one of the processors connected to the bus at a position determined according to a position where the damaged processor is connected to the bus such that the at least one processor carries out data transmission with respect to the predetermined processing module, using a data transmission path, among the plurality of data transmission paths, different from a data transmission path to be used in data transmission from the damaged processor to the predetermined processing module; and
   a step of restricting data transmission by the communication restricted processor via the bus.

9. A non-transitory, computer readable information storage medium storing a program to be executed by a multiprocessor system having a plurality of processing modules, including a predetermined number, being three or more, of processors, and a bus, comprising a plurality of data transmission paths, for relaying data transmission among the respective processing modules, the program causing the multiprocessor system to function as:
   damaged processor specifying means for specifying at least one damaged processor among the predetermined number of processors;
   communication restricted processor selecting means for selecting as a communication restricted processor subjected to communication restriction at least one of the processors connected to the bus at a position determined according to a position where the damaged processor is connected to the bus such that the at least one processor carries out data transmission with respect to a predetermined processing module among the plurality of processing modules, using a data transmission path, among the plurality of data transmission paths, different from a data transmission path to be used in data transmission from the damaged processor to the predetermined processing module; and
   communication restriction means for restricting data transmission by the communication restricted processor via the bus.

10. A multiprocessor system, comprising:
   a plurality of processing modules, including a plurality of processors;
   a ring type bus for relaying data transmission among the respective processing modules;
   table storage means for storing a table providing association between a subset of processors which are some of the plurality of processors and a plurality of processor designation information items each designating any of the subset of processors;
   damaged processor specifying means for specifying at least one damaged processor among the plurality of processors; and
   table production means for producing the table such that the processor designation information items each designate any of the plurality of processors, excluding the damaged processor, according to a position where the damaged processor is connected to the ring type bus and a processor to be designated by each of the processor designation information items from among the plurality of processors, is determined according to a position at which each of the processors, excluding the damaged processor, is connected to the bus,
   wherein each of the subset of processors carries out, based on an application program including a plurality of predetermined processes each associated with any of the processor designation information items, and the table produced, the predetermined process associated with the processer designation information item designating that processor.

11. The multiprocessor system according to claim 10, wherein the table production means determines a processor to be designated by each of the processor designation information items from among the plurality of processors, excluding the damaged processor, according to a positional relationship between positions where the respective processors, excluding the damaged processor, are connected to the ring type bus and a position where a predetermined processing module, among the plurality of processing modules, is connected to the ring type bus.

12. A control method for controlling a multiprocessor system having a plurality of processing modules, including a plurality of processors, and a ring type bus for relaying data transmission among the respective processing modules, comprising:
   a step of specifying at least one damaged processor among the plurality of processors; and
   a step of producing a table providing association between a subset of processors which are some of the plurality of processors and a plurality of processor designation information items each designating any of the subset of processors, such that the processor designation information items each designate any of the plurality of processors, excluding the damaged processor, according to a position where the damaged processor is connected to the ring type bus and a processor to be designated by each of the processor designation information items from among the plurality of processors, is determined according to a position at which each of the processors, excluding the damaged processor, is connected to the bus,
   wherein each of the subset of processors carries out, based on an application program including a plurality of predetermined processes each associated with any of the processor designation information items, and the table produced, the predetermined process associated with the processer designation information item designating that processor.

13. A non-transitory, computer readable information storage medium storing a program to be executed by a multiprocessor system having a plurality of processing modules, including a plurality of processors, and a ring type bus for relaying data transmission among the respective processing modules, the program causing the multiprocessor system to function as:

damaged processor specifying means for specifying at least one damaged processor among the plurality of processors; and table production means for producing a table showing association between a subset of processors which are some of the plurality of processors and a plurality of processor designation information items each designating any of the subset of processors, such that the processor designation information items each designate any of the plurality of processors, excluding the damaged processor, according to a position where the damaged processor is connected to the ring type bus and a processor to be designated by each of the processor designation information items from among the plurality of processors, is determined according to a position at which each of the processors, excluding the damaged processor, is connected to the bus, wherein each of the subset of processors carries out, based on an application program including a plurality of predetermined processes each associated with any of the processor designation information items, and the table produced, the predetermined process associated with the processer designation information item designating that processor.

14. A multiprocessor system, comprising:

a plurality of processing modules, including a predetermined number, being three or more, of processors, a bus for relaying data transmission among the respective processing modules, a plurality of data transmission paths within the bus, such that the predetermined number of processors carry out data transmission with respect to a predetermined processing module among the plurality of processing modules, respectively, using any of the plurality of data transmission paths, damaged processor specifying means for specifying at least one damaged processor among the predetermined number of processors; and communication restricting means for restricting data transmission via the bus by at least one of the processors connected to the bus at a position determined according to a position where the damaged processor is connected to the bus, the at least one processor determined as a communication restricted processor subjected to communication restriction such that the at least one processor carries out data transmission with respect to the predetermined processing module, using a data transmission path, among the plurality of data transmission paths, different from a data transmission path to be used in data transmission from the damaged processor to the predetermined processing module.

15. A control method for controlling a multiprocessor system having a plurality of processing modules, including a predetermined number, being three or more, of processors, and a bus for relaying data transmission among the respective processing modules, comprising:

a step of facilitating data transmission between the predetermined number of processors and a predetermined processing module among the plurality of processing modules via one or more of a plurality of data transmission paths comprised within the bus, a step of specifying at least one damaged processor among the predetermined number of processors; and a step of restricting data transmission via the bus by at least one of the processors connected to the bus at a position determined according to a position where the damaged processor is connected to the bus, the at least one processor determined as a communication restricted processor subjected to communication restriction such that the at least one processor carries out data transmission with respect to the predetermined processing module, using a data transmission path, among the plurality of data transmission paths, different from a data transmission path to be used in data transmission from the damaged processor to the predetermined processing module.

16. A multiprocessor system, comprising:

a plurality of processing modules, including a plurality of processors, a ring type bus for relaying data transmission among the respective processing modules, and table storage means for storing a table showing association between a subset of processors which are some of the plurality of processors and a plurality of processor designation information items each designating any of the subset of processors, in which the plurality of processor designation information items each designate any of the plurality of processors, excluding the damaged processor, as determined according to a position where at least one damaged processor is connected to the ring type bus and a processor to be designated by each of the processor designation information items from among the plurality of processors, is determined according to a position at which each of the processors, excluding the damaged processor, is connected to the bus, wherein each of the subset of processors carries out, based on an application program including a plurality of predetermined processes each associated with any of the processor designation information items, and the table produced, the predetermined process associated with the processer designation information item designating that processor.

17. A control method for controlling a multiprocessor system having a plurality of processing modules, including a plurality of processors, and a ring type bus for relaying data transmission among the respective processing modules, comprising:

a step of obtaining a table showing association between a subset of processors which are some of the plurality of processors and a plurality of processor designation information items each designating any of the subset of processors, in which the plurality of processor designation information items each designate any of the plurality of processors, excluding the damaged processor, as determined according to a position where at least one damaged processor is connected to the ring type bus and a processor to be designated by each of the processor designation information items from among the plurality of processors, is determined according to a position at which each of the processors, excluding the damaged processor, is connected to the bus, and a step of carrying out, by each of the subset of processors, based on an application program including a plurality of predetermined processes each associated with any of the processor designation information items, and the table produced, the predetermined process associated with the processer designation information item designating that processor.

* * * * *